US011387666B2

(12) United States Patent
Dalena

(10) Patent No.: US 11,387,666 B2
(45) Date of Patent: Jul. 12, 2022

(54) DUAL STAGE BATTERY CHARGER

(71) Applicant: Dialog Semiconductor (UK) Limited, London (GB)

(72) Inventor: Francesco Dalena, Leghorn (IT)

(73) Assignee: Dialog Semiconductor (UK) Limited, London (GB)

( * ) Notice: Subject to any disclaimer, the term of this patent is extended or adjusted under 35 U.S.C. 154(b) by 636 days.

(21) Appl. No.: 16/372,752

(22) Filed: Apr. 2, 2019

(65) Prior Publication Data

US 2020/0119573 A1  Apr. 16, 2020

(30) Foreign Application Priority Data

Oct. 11, 2018  (DE) .......................... 102018217445.8

(51) Int. Cl.
 *H02J 7/00* (2006.01)
 *H02M 3/158* (2006.01)
 *H02M 1/00* (2006.01)

(52) U.S. Cl.
 CPC .......... *H02J 7/0072* (2013.01); *H02M 3/158* (2013.01); *H02M 1/0003* (2021.05)

(58) Field of Classification Search
 USPC ....................................................... 320/107
 See application file for complete search history.

(56) References Cited

U.S. PATENT DOCUMENTS

| 2008/0239772 | A1 | 10/2008 | Oraw et al. | |
| 2009/0278520 | A1* | 11/2009 | Perreault | H02M 3/07 323/282 |
| 2015/0102779 | A1 | 4/2015 | Schumacher et al. | |
| 2015/0137788 | A1 | 5/2015 | Li et al. | |
| 2017/0346329 | A1 | 11/2017 | Shi et al. | |
| 2019/0089244 | A1* | 3/2019 | Koski | H02M 3/073 |

FOREIGN PATENT DOCUMENTS

| DE | 11 2012 004 377 | 7/2014 |
| WO | WO 2013/059446 | 4/2013 |

OTHER PUBLICATIONS

German Office Action, File No. 10 2018 217 445.8, Applicant: Dialog Semiconductor (UK) Limited, dated Jun. 4, 2019, 7 pages and English language translation, 9 pages.
"Quick Charge," Wikipedia, found: Mar. 6, 2019, 2 pages, https://en.wikipedia.org/wiki/Quick_Charge.

* cited by examiner

*Primary Examiner* — Bryce M Aisaka
(74) *Attorney, Agent, or Firm* — Saile Ackerman LLC; Stephen B. Ackerman

(57) ABSTRACT

A dual stage power converter and a method for charging an energy storage device are presented. The dual stage power converter has a first stage and a second stage arranged in series. A first stage has a voltage divider circuit with a flying capacitor to convert an input voltage at an input of the dual stage power converter into a smaller, intermediate voltage at an intermediate node of the dual stage power converter. A second stage has a voltage regulator circuit to receive said intermediate voltage for regulating, using a feedback loop, an output voltage at an output of the dual stage power converter. The described dual stage power converter enables a reduction of the switching power losses in the voltage regulator circuit and a reduction of the resistive power losses within an external cable connecting the dual stage power converter with an external wall adapter.

20 Claims, 13 Drawing Sheets

DUAL STAGE BATTERY CHARGER

TECHNICAL FIELD

The present document relates to battery charging systems. In particular, the present document relates to highly efficient dual stage battery chargers for charging batteries at high currents.

BACKGROUND

FIG. 1 shows a typical battery charging system 1 which is used to charge a battery 13 of a mobile electronic device. The battery charging system 1 comprises a wall adapter 10 and a battery charger 12 which are connected via a cable 11. The wall adapter 10 is configured to perform an electrical conversion of alternating current AC to direct current DC. Said direct current is provided to a battery charger 12 via cable 11. The battery charger 12 is then configured to perform a DC/DC conversion and to provide a regulated output voltage and/or a regulated output current for charging the battery 13. Due to its size and its substantial heat generation, the wall adapter is typically external to the mobile electronic device, while the battery charger 12 is integrated together with the battery 13 in a housing of the mobile electronic device.

Two recent trends have complicated the design of modern battery chargers. On the one hand, a first trend is the increasing battery capacity which is required to satisfy the increased power consumption of the mobile electronic devices (such as e.g. smart phones or tablets). As a result, there is a demand for increased charging currents which are injected into the battery to keep the charging times within acceptable limits. If, however, such an increased charging current is flowing through cable 11, the power loss $P = R \cdot I^2$ in cable 11 is significantly increasing, wherein R denotes the electrical resistance of the cable 11, and I denotes the electrical current through cable 11. Such increased power losses may be compensated by using cables with lower electrical resistance R. This, in turn, may ultimately lead to cables with an increased thickness, which is undesirable and may result in economic disadvantages.

On the other hand, a second trend is the introduction of universal serial bus USB charging voltages which are much greater than the standard +5V. As illustrated in FIG. 2, the power rules of the USB power delivery PD 3.0 standard enables various voltages ranging from 5V up to 20V for three different power categories >15 W, >27 W, and >45 W. Unfortunately, increased voltages within the battery charger 12 may result in serious thermal limitations and power losses. If a standard buck power converter is used as battery charger 12, the output bridge of the buck power converter is responsible for the major part of the power losses. An output bridge 3 (also denoted as half bridge or power stage) of a buck power converter is illustrated in FIG. 3. The output bridge 3 comprises a high-side switch 31 which is driven by driver 33 and coupled between an input voltage VIN 35 and a switching terminal SW 36. The output bridge 3 also comprises a low-side switch 32 which is driven by driver 34 and coupled between the switching terminal SW 36 and ground 37. In addition, FIG. 3 depicts metal-oxide-semiconductor field effect transistor MOSFET parasitic capacitors 38, 39, 40, 41, 42, and 43 that are responsible for the switching losses. Basically, every time the output bridge switches, the parasitic capacitors 38, 39, 40, 41, 42, and 43 are generating switching power losses $P_{SW} \approx V^2 \cdot C \cdot f$, wherein V denotes the voltage across the respective parasitic capacitor, C denotes the capacitance of the respective parasitic capacitor, and f denotes the switching frequency. In case the battery charger 12 needs to support high voltages (such as the voltages of the USB PD 3.0 standard shown in FIG. 2), both the high-side switch 31 and the low-side switch 32 need to be high voltage devices. High voltage devices are bigger than low voltage devices (<5V) because they have to sustain higher voltages between drain and source. Since they are bigger, also the associated parasitic capacitors 38, 39, 40, 41, 42, and 43 are bigger, and so are the power losses of the battery charger 12.

SUMMARY

The present document addresses the above mentioned technical problems. In particular, the present document addresses the technical problem of providing a highly efficient battery charger with reduced power losses, both within the battery charger itself and also within the cable connecting the battery charger with the wall adapter.

According to an aspect, a dual stage power converter for charging an energy storage device is presented. The energy storage device may be e.g. a battery. The dual stage power converter may comprise a first stage and a second stage connected in series. The first stage may comprise a voltage divider circuit with a flying capacitor configured to, during a first charging phase, convert an input voltage at an input of the dual stage power converter into a smaller, intermediate voltage at an intermediate node of the dual stage power converter. The second stage may comprise a voltage regulator circuit configured to receive said intermediate voltage for regulating, using a feedback loop, an output voltage at an output of the dual stage power converter. Using said voltage divider circuit in series with said voltage regulator circuit for generating said reduced intermediate voltage, it becomes possible to (a) reduce the switching power losses in the voltage regulator circuit and (b) reduce resistive power losses within an external cable connecting the dual stage power converter with an external wall adapter. Specifically, advantage (b) is due to the fact that the voltage divider circuit allows higher input voltages at the input of the dual stage power converter. For instance, the high input voltages according to an USB standard may be negotiated with the external wall adaptor. A corresponding input current at the input of the dual stage power converter may be decreased while—at the same time—keeping the total input power (i.e. the product of input current and input voltage) constant. Thus, the power losses ($P = R \cdot I^2$) in the cable may be reduced. In other words, a cable with a reduced thickness/width may be used.

Neither the first stage nor the voltage divider circuit may include a feedback loop for regulating the intermediate voltage. For instance, the voltage divider circuit may be a switched capacitor SC circuit. As such, the voltage divider circuit may comprise capacitors and switching elements, wherein the switching elements are configured to transfer charges between said capacitors. More specifically, the voltage divider circuit may only comprise capacitors and switching elements. Using a SC circuit as voltage divider circuit is in particular beneficial as the separation in a voltage step-down in the first stage and the voltage regulation in the second stage exploits the inherent advantages of SC power converters which are high voltage step-down and high efficiency, while not tasking the SC power converter with voltage regulation, which SC power converters cannot perform efficiently. The voltage regulation function is then performed by the voltage regulator circuit, which may be e.g. a synchronous buck converter. Since the second stage operates at a lower voltage and voltage transformation ratio, the second stage may operate at high frequency with an inductor of reduced size.

As already mentioned in the foregoing description, the dual stage power converter may further comprise an input voltage setting unit configured to instruct, during the first charging phase, an external power source to provide a first input voltage to the input of the dual stage power converter. The input voltage setting unit may also be configured to instruct, during a second charging phase, the external power source to provide a second input voltage to the input of the dual stage power converter, wherein the first input voltage is larger than the second input voltage. In particular, the first input voltage may be substantially larger the second input voltage. The external power source may be e.g. a wall adapter, and the input voltage setting unit may be configured to negotiate the input voltage of the dual stage power converter with said wall adapter using a universal serial bus USB communication protocol. For example, the input voltage setting unit may be configured to select one of the input voltages depicted in FIG. 3.

During the first charging phase, the battery may be charged with a constant current, whereas during the second charging phase, the battery may be charged with a constant voltage. The voltage divider circuit may be configured to, during the second charging phase, disable the first stage of the dual stage power converter by directly connecting the input of the dual stage power converter to the intermediate node of the dual stage power converter. In this way, during the second charging phase, only the voltage regulator circuit may be actively regulating the output voltage.

During the second charging phase, the charging current may be substantially lower than the constant charging current during the first charging phase. Specifically, the voltage divider circuit may be configured to receive—during the first charging phase—an input current from the input of the dual stage power converter and may be configured to output an intermediate current at the intermediate node, wherein the intermediate current is larger than said input current. For example, the voltage divider circuit may be a current multiplier. As a consequence, the voltage divider circuit makes it possible that a lower current is flowing through the cable to the input of the dual stage power converter, and this current is boosted after passing through the cable with the help of said current multiplier. Hence, power losses in the cable may be minimized as discussed above. As an additional advantage, the size of an inductor included in the voltage regulator circuit may be chosen to be smaller, resulting in reducing inductive power losses within the voltage regulator circuit.

The voltage divider circuit may comprises a first switching element, a second switching element, a third switching element, and a fourth switching element. The first switching element may be coupled between an input of the voltage divider circuit and a first terminal of the flying capacitor. The second switching element may be coupled between a second terminal of the flying capacitor and a reference potential. The third switching element may be coupled between the first terminal of the flying capacitor and an output of the voltage divider circuit. Finally, the fourth switching element may be coupled between the second terminal of the flying capacitor and the output of the voltage divider circuit. Further, the dual stage power converter may comprise an output capacitor coupled between the output of the voltage divider circuit and a reference potential.

In this scenario, the voltage divider circuit is configured to disable the first stage of the dual stage power converter by closing (i.e. turning on) the first and the third switching element and by opening (i.e. turning off) the second and the fourth switching element. In particular, during the second charging phase, the first stage of the dual stage power converter may be permanently disabled.

In the first charging phase, however, the voltage divider circuit may be configured to switch between a first switching state in which the first and the fourth switching element are closed and the second and the third switching element are open, and a second switching state in which the first and the fourth switching element are open, and the second and the third switching element are closed. In the first switching state, both the flying capacitor and the output capacitor are charged, whereas in the second charging phase, both the flying capacitor is discharged and the output capacitor is charged. The voltage divider circuit may be configured to switch between the first switching state and the second switching state with a switching frequency that is substantially lower than a switching frequency of the voltage regulator circuit.

The voltage regulator circuit may be a buck converter, a boost converter or a buck-boost converter. For example, the voltage regulator circuit may be a buck converter comprising a high-side switching element, a low-side switching element and an inductor. The inductor may be coupled between a switching terminal and an output of the voltage regulator circuit. The high-side switching element may be coupled between an input of the voltage regulator circuit and the switching terminal. The low-side switching element may be coupled between the switching terminal and a reference potential. In addition, an output capacitor may be coupled between the output of the voltage regulator circuit and the reference potential.

The buck converter may be configured to turn on the high-side switching element and the low-side switching element in an alternating manner, such that either the high-side switching element or the low-side switching element is turned on a certain point in time. The switching frequency of the voltage regulator circuit may then be defined as the frequency at which the voltage regulator circuit is turning on the high-side switching element, or, alternatively, the frequency at which the voltage regulator circuit is turning on the low-side switching element.

According to another aspect, a method for operating a dual stage power converter for charging an energy storage device is described. The method may comprise steps which correspond to the features of the dual stage power converter described in the present document. To be more specific, a method of operating a dual stage power converter for charging an energy storage device is described, wherein the dual stage power converter comprises a first stage and a second stage. The method comprising converting, by a voltage divider circuit with a flying capacitor of the first stage, during a first charging phase, an input voltage at an input of the dual stage power converter into a smaller, intermediate voltage at an intermediate node of the dual stage power converter. The method comprises receiving, by a voltage regulator circuit of the second stage, said intermediate voltage, and regulating, by the voltage regulator circuit of the second stage, using a feedback loop, an output voltage at an output of the dual stage power converter.

The method may further comprise instructing, by an input voltage setting unit, during the first charging phase, an external power source to provide a first input voltage to the input of the dual stage power converter. The method may further comprise instructing, by the input voltage setting unit, during a second charging phase, the external power source to provide a second input voltage to the input of the dual stage power converter, wherein the first input voltage is larger than the second input voltage.

The method may further comprise disabling, by the voltage divider circuit, during the second charging phase, the first stage of the dual stage power converter by directly connecting the input of the dual stage power converter to the intermediate node of the dual stage power converter. The voltage divider circuit may be for example a switched capacitor SC circuit. That is, the method may further comprise receiving, by the voltage divider circuit, an input current from the input of the dual stage power converter, and outputting, by the voltage divider circuit, an intermediate current at the intermediate node, wherein the intermediate current is larger than said input current. In particular, the voltage divider circuit may comprise a first switching element, a second switching element, a third switching element, and a fourth switching element. In this configuration, the method may further comprise coupling the first switching element between an input of the voltage divider circuit and a first terminal of the flying capacitor, coupling the second switching element between a second terminal of the flying capacitor and a reference potential, coupling the third switching element between the first terminal of the flying capacitor and an output of the voltage divider circuit, and coupling the fourth switching element between the second terminal of the flying capacitor and the output of the voltage divider circuit.

The method may further comprise disabling the first stage of the dual stage power converter by closing the first and the third switching element and by opening the second and the fourth switching element.

The method may further comprise switching, by the voltage divider circuit, between a first switching state in which the first and the fourth switching element are closed and the second and the third switching element are open, and a second switching state in which the first and the fourth switching element are open, and the second and the third switching element are closed. The method may further comprise switching, by the voltage divider circuit, between the first switching state and the second switching state with a switching frequency that is substantially lower than a switching frequency of the voltage regulator circuit.

Moreover, at least one of the switching elements of the voltage divider circuit may be configured to switch when an intermediate current flowing from the output of the voltage divider circuit to the input of the voltage regulator circuit is zero or close to zero. As such, the voltage divider circuit may be configured to switch the at least one of switching elements of the voltage divider circuit when a current through said at least one switching element is zero or close to zero. More precisely, the voltage divider circuit may be configured to close or open the at least one of the switching elements of the voltage divider circuit when a current through said at least one switching element is zero or close to zero. Therefore, in general, the switching times of the switching elements of the voltage divider circuit may be based on (or even synchronized with) the switching times of the low-side switching element and the high-side switching elements of the voltage regulator circuit. As an advantage, the switching losses within the switching elements of the voltage divider circuit may be zero or close to zero, too.

According to a further aspect, a software program is described. The software program may be adapted for execution on a processor and for performing the method steps outlined in the present document when carried out by the processor.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 1:
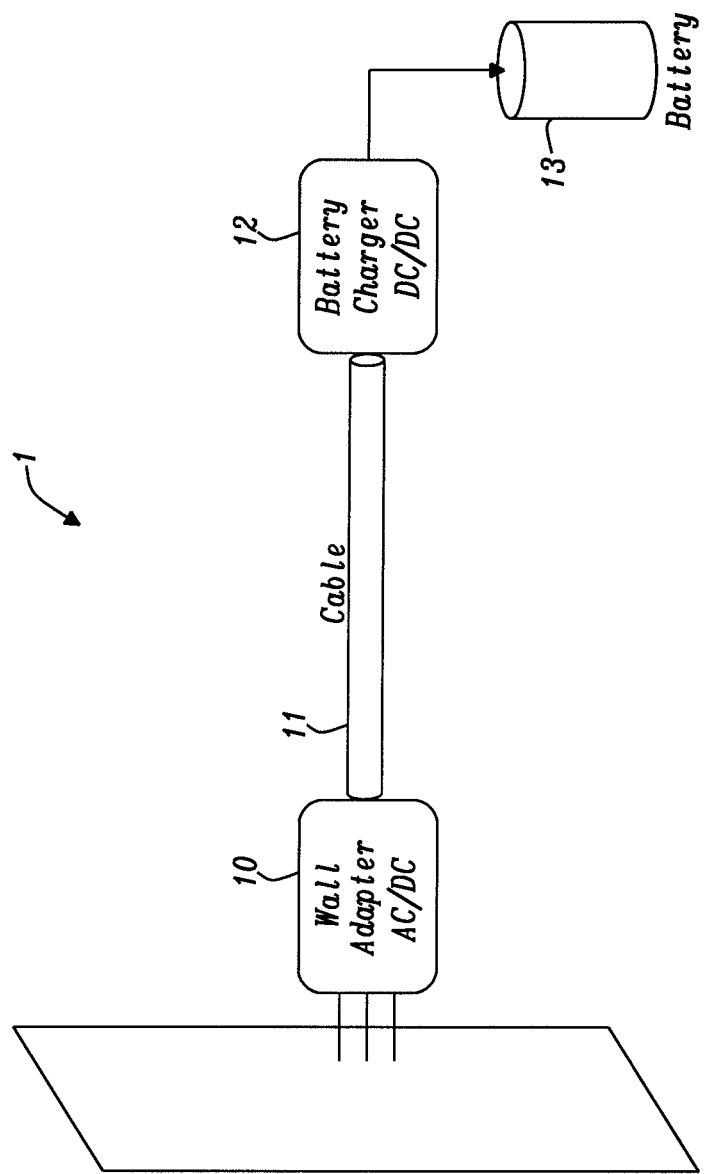
FIG. 1 shows a battery charging system.
Figure 2:
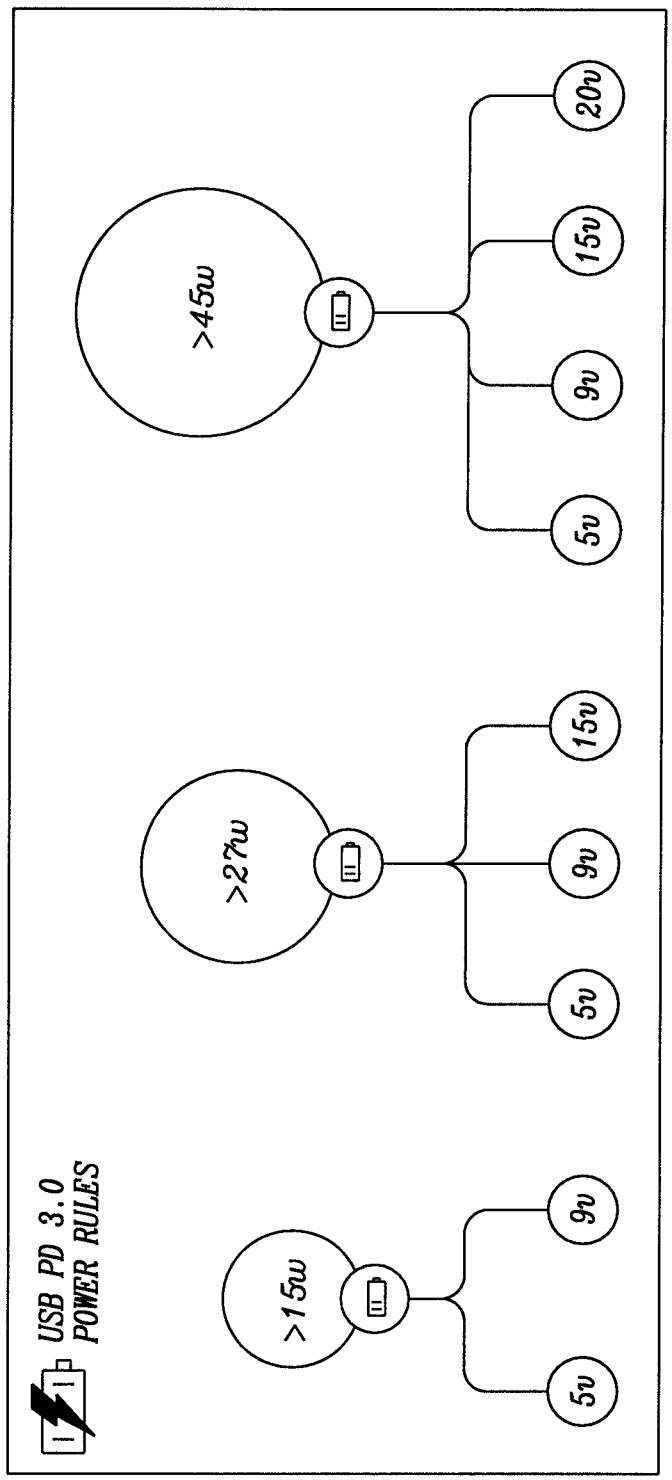
FIG. 2 shows power rules of the universal serial bus USB power delivery PD standard 3.0.
Figure 3:
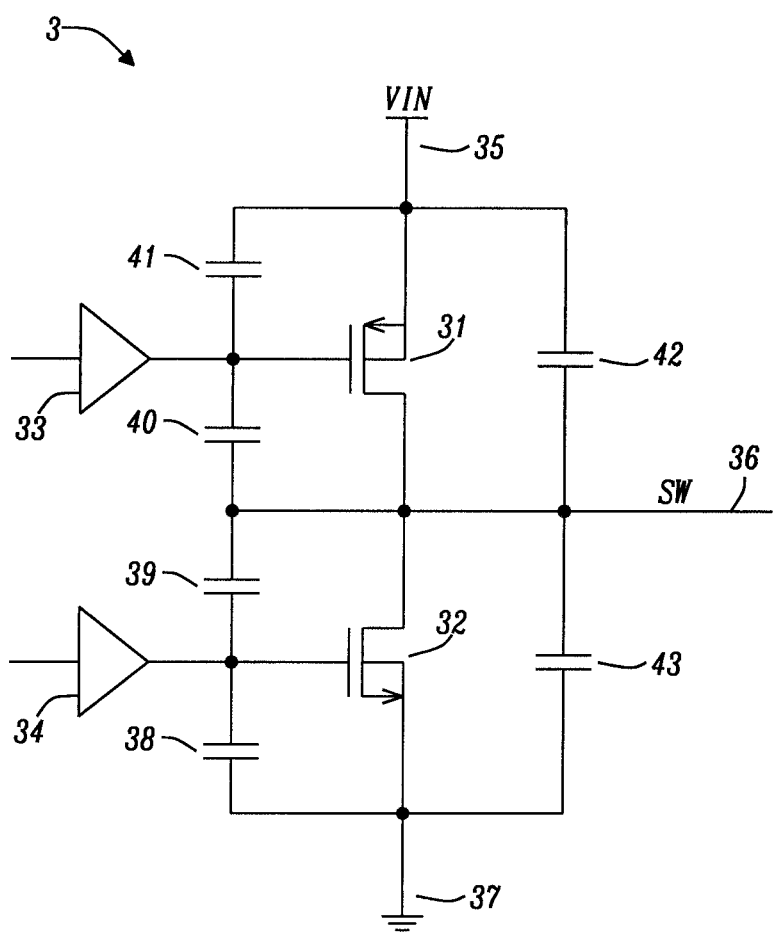
FIG. 3 shows an output bridge of a power converter with parasitic capacitors.
Figure 4:
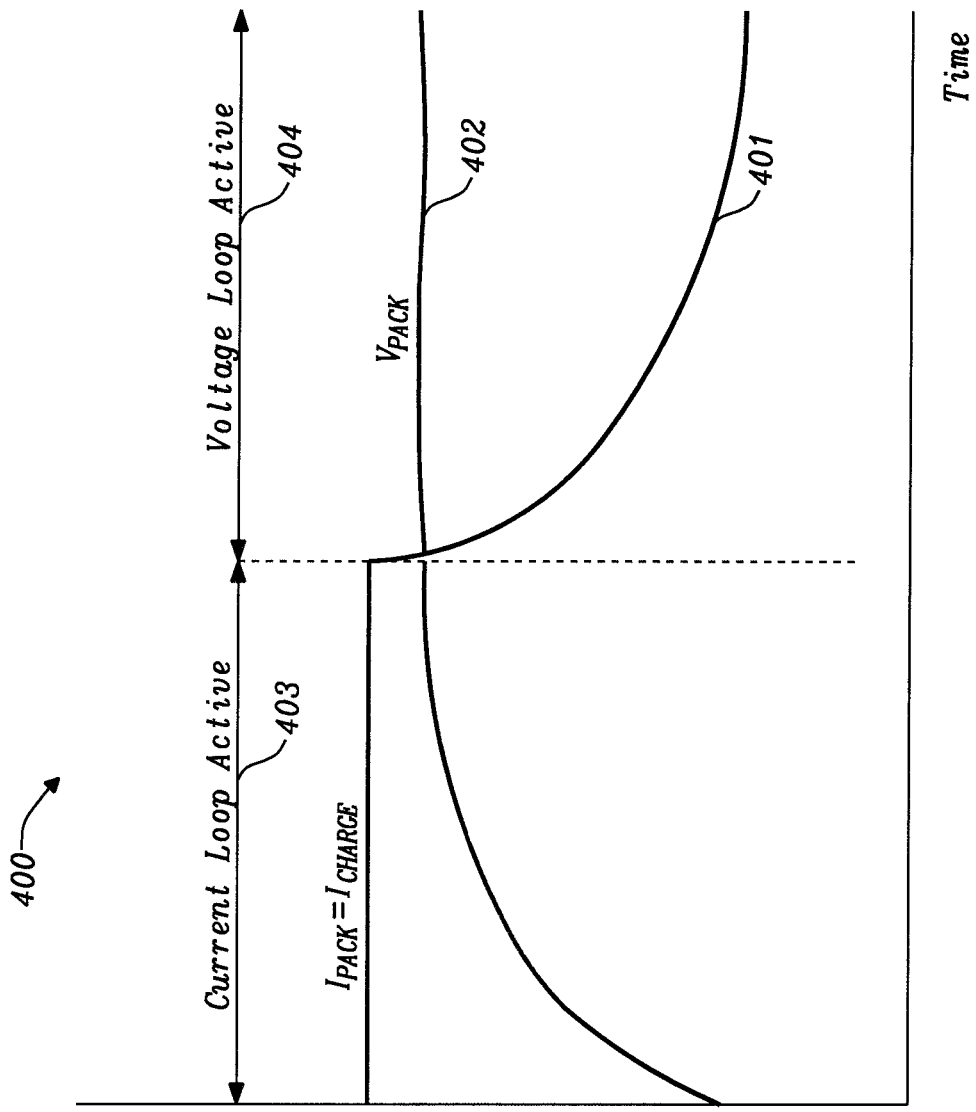
FIG. 4 shows a charging voltage and a charging current according to a charging profile.

FIG. 4 shows a charging current 401 and a charging voltage 402 over time according to an exemplary charging profile 400 which is used to charge a battery. During a first charging phase 403, the charging current 401 is kept constant, while the charging voltage 402 is constantly increasing. During the second, subsequent charging phase 404, the charging voltage 402 is kept constant while the charging current 401 is monotonically decreasing. It should be noted that a battery charging system may switch from the first charging phase 403 to the second charging phase 404 as soon as the charging voltage 402 reaches a pre-determined threshold value.

Figure 5:
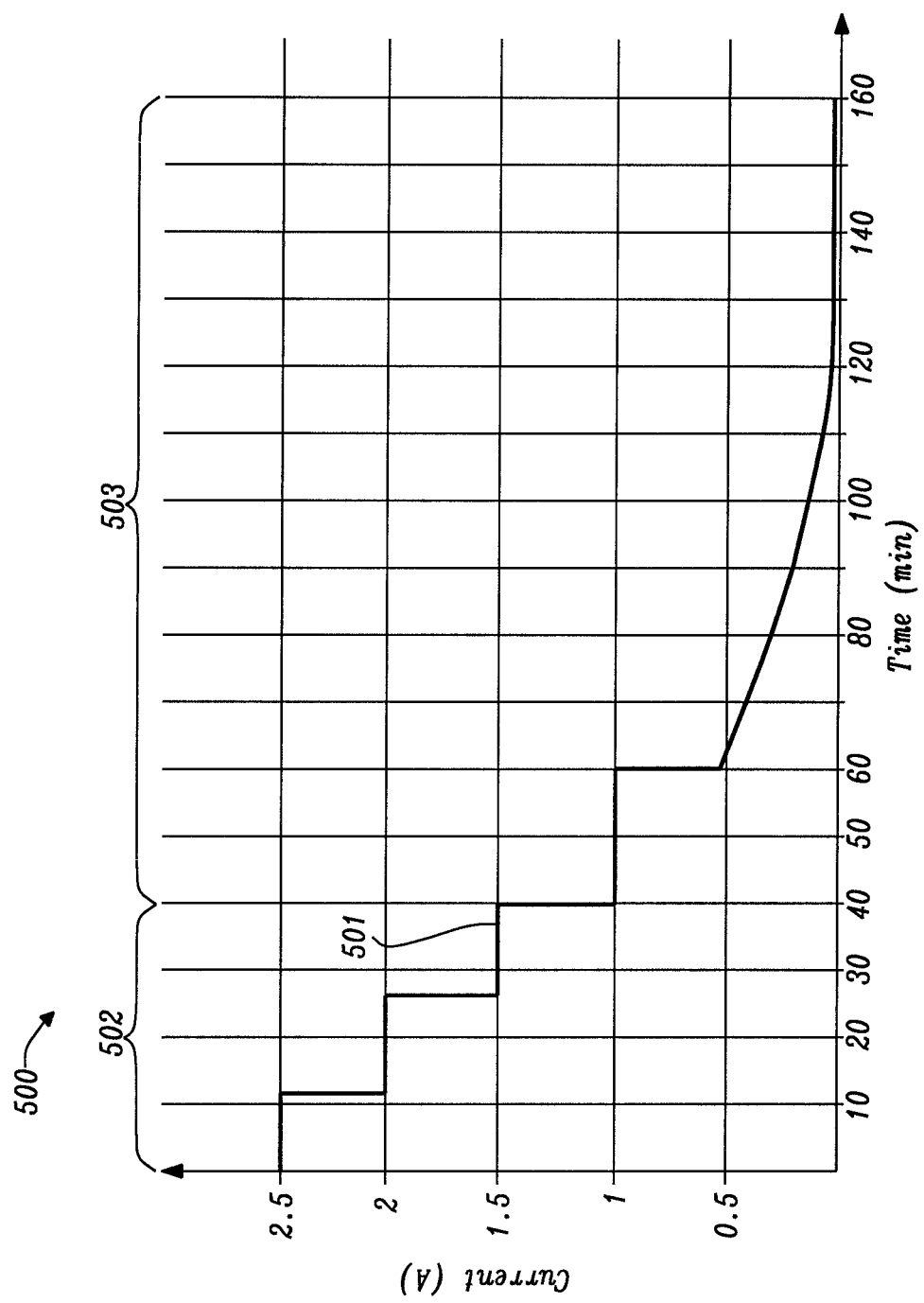
FIG. 5 shows a charging current according to another charging profile.

FIG. 5 shows a charging current 501 according to another, more realistic, exemplary charging profile 500 which takes into account the temperature rise within the charger and/or the battery. In this charging profile 500, the charging current 501 is a step-wise decreasing function during a first charging phase 502. In the illustrated example, the first charging phase 502 lasts for one hour. In a second charging phase 503, the charging voltage is again kept constant and the charging current 501 is a continuously decreasing and approaching 0A.

Figure 6:
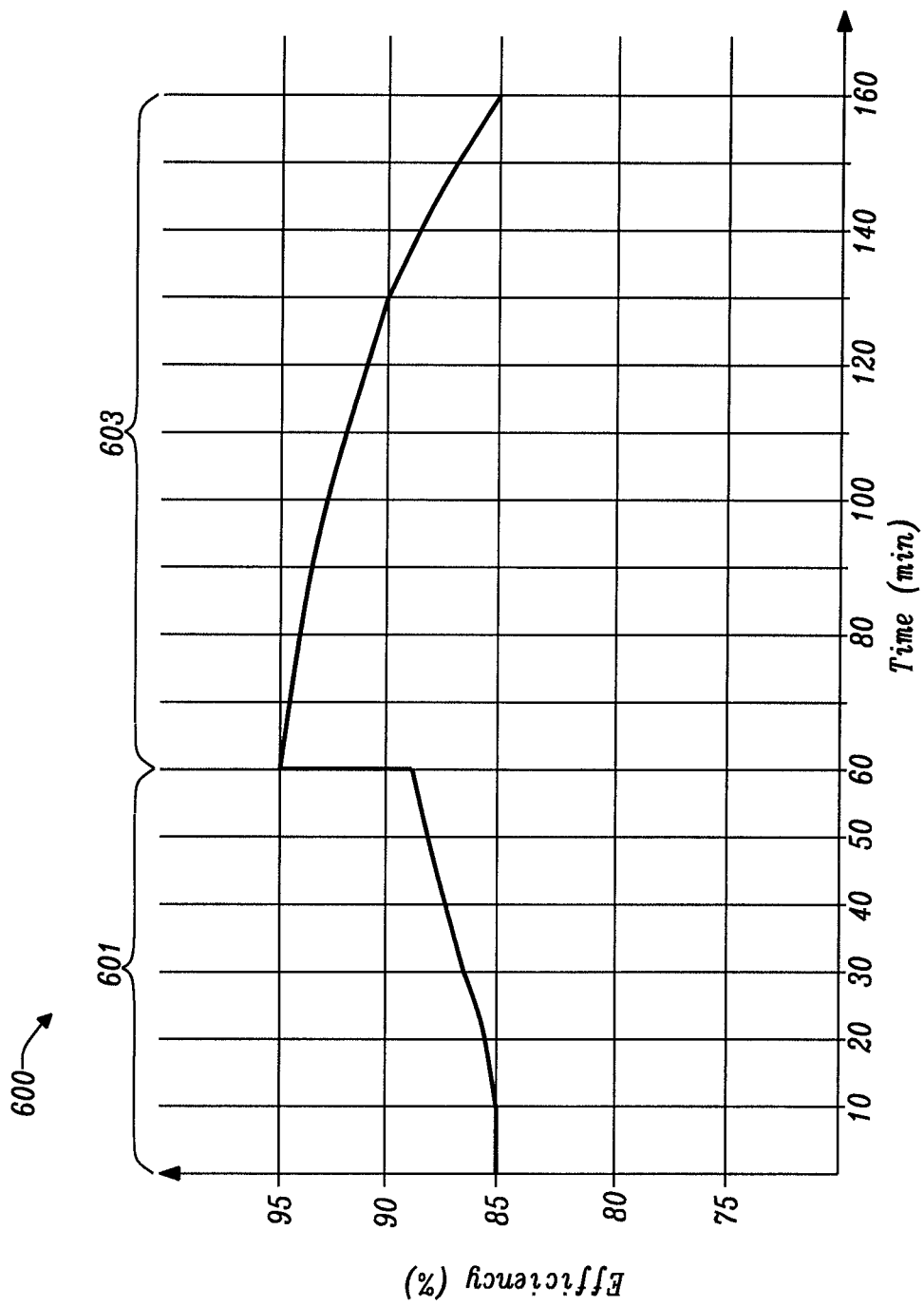
FIG. 6 shows an efficiency curve during battery charging.

FIG. 6 shows an efficiency curve 600 during battery charging, with a first charging phase 601 and a second charging phase 602. Efficiency curve 600 serves as an example for a typical efficiency curve during a charging process in which, during the first charging phase 601, a high charging voltage is used, and in which, during the second charging phase 602, a low charging voltage is used for charging a battery.

A main idea of the present invention is now to use a dual stage power converter for charging a battery. The dual stage power converter may comprise a first stage and a second stage connected in series. The first stage may comprise a voltage divider circuit configured to, during a first charging phase, convert an input voltage at an input of the dual stage power converter into a smaller, intermediate voltage at an intermediate node of the dual stage power converter. The second stage may comprise a voltage regulator circuit configured to receive said intermediate voltage for regulating, using a feedback loop, an output voltage at an output of the dual stage power converter. During a first, high voltage charging phase, both the voltage divider circuit and the voltage regulator circuit may be enabled and the battery may be charged at a constant current, whereas in a second, low voltage charging phase, only the voltage regulator circuit may be enabled and the voltage divider circuit may be disabled. During the second charging phase, the voltage regulator circuit may be configured to charge the battery at a constant, well-defined voltage. This arrangement allows the voltage regulator circuit to work at a relatively low voltage, resulting in substantially reduced switching losses.

Figure 7:
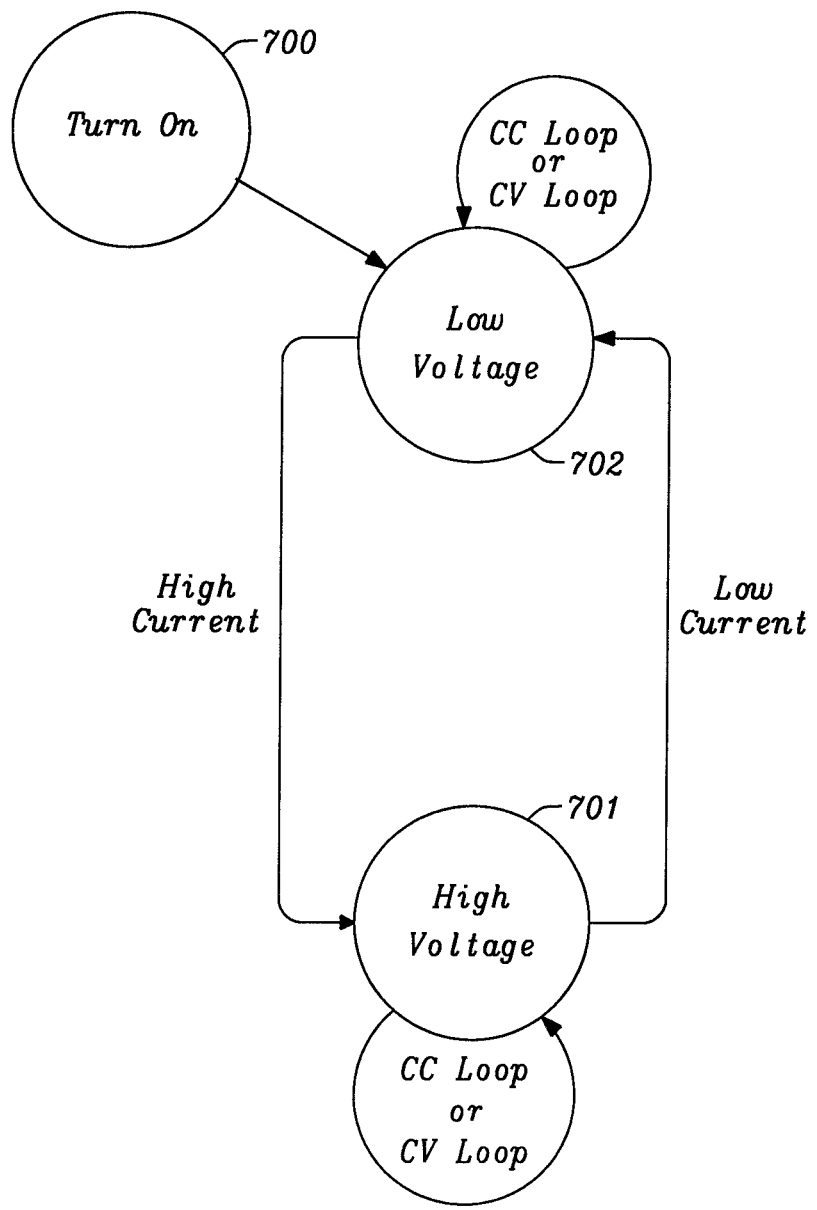
FIG. 7 shows a state machine of a dual stage power converter.

FIG. 7 shows a state machine of the presented dual stage power converter for switching between high voltage and low voltage operation. The state machine may be initialized in a turn on state 700, and may be subsequently switching between a high voltage state 701 and a low voltage state 702 as shown in FIG. 7. In both the high voltage state 701 and the low voltage state 702, a constant current CC control loop or a constant voltage CV control loop may be active.

Figure 8:
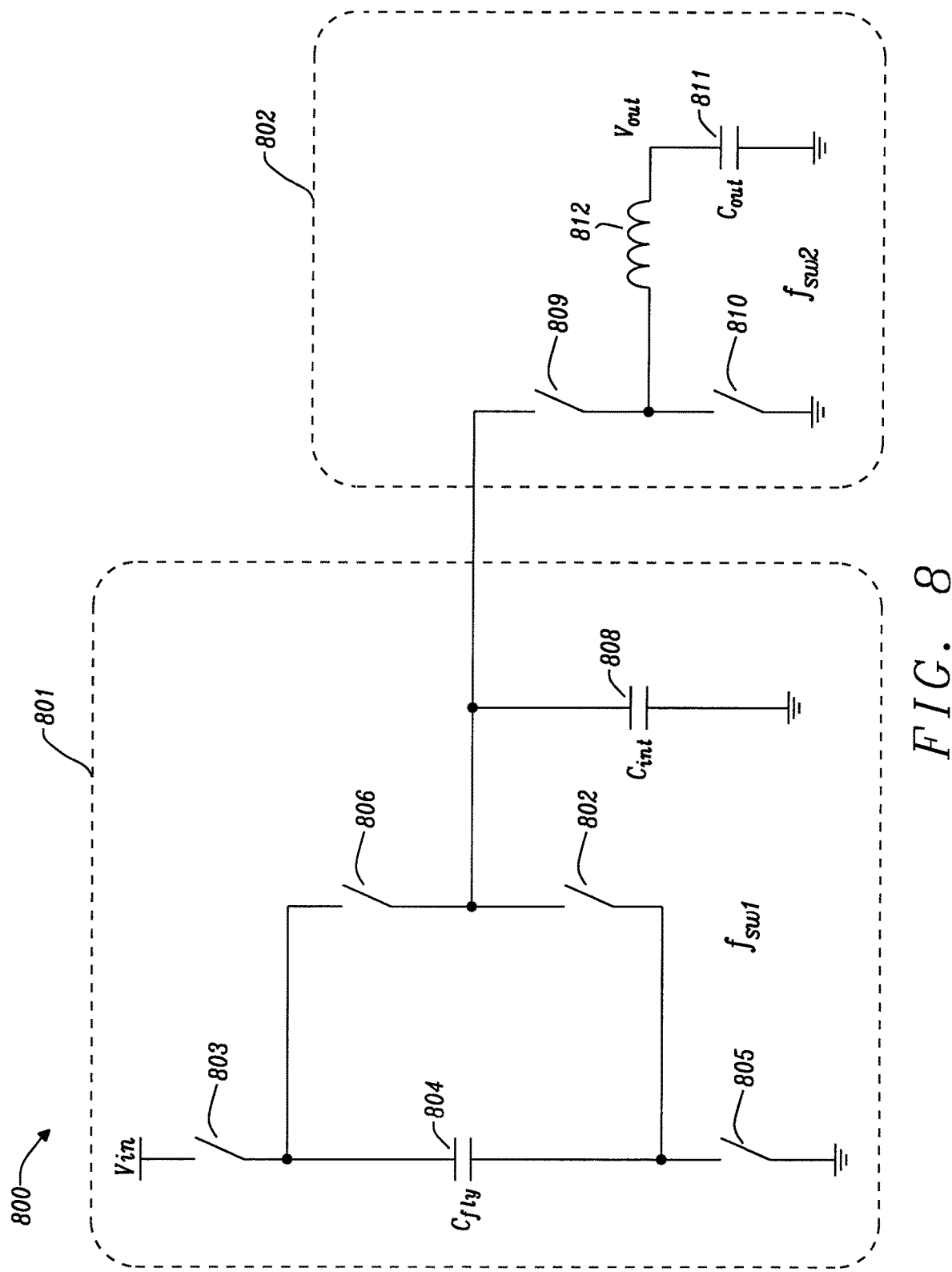
FIG. 8 shows an exemplary dual stage power converter comprising a switched capacitor SC power converter and a buck power converter.

FIG. 8 shows an exemplary dual stage power converter 800 according to the teachings of the present invention. In the depicted example, a first stage of the dual stage power converter 800 comprises a voltage divider circuit 801 which is implemented as a switched capacitor SC circuit and a voltage regulator circuit 802 which is implemented as synchronous buck power converter. In FIG. 8, both stages of the power converter are active and a high voltage is applied to input terminal Vin. Said SC circuit comprises a flying capacitor 804, a first switching element 803, a second switching element 805, a third switching element 806, and a fourth switching element 807. The first switching element 803 is coupled between an input of the voltage divider circuit 801 and a first terminal of the flying capacitor 804. The second switching element 805 is coupled between a second terminal of the flying capacitor 804 and ground. The third switching element 806 is coupled between the first terminal of the flying capacitor 804 and an output of the voltage divider circuit. The fourth switching element 807 is coupled between the second terminal of the flying capacitor 804 and the output of the voltage divider circuit 801. Further, an output capacitor 808 is coupled between the output of the voltage divider circuit 801 and a reference potential.

On the other hand, in this example, the voltage regulator circuit 802 is implemented as a buck converter comprising a high-side switching element 809, a low-side switching element 809, an inductor 812, and an output capacitor 811. The inductor 812 is coupled between a switching terminal and an output of the voltage regulator circuit 812. The high-side switching element 809 is coupled between an input of the voltage regulator circuit 802 and the switching terminal. The low-side switching element 810 is coupled between the switching terminal and a reference potential. The output capacitor 811 connects the output of the dual stage power converter with ground.

Figure 9:
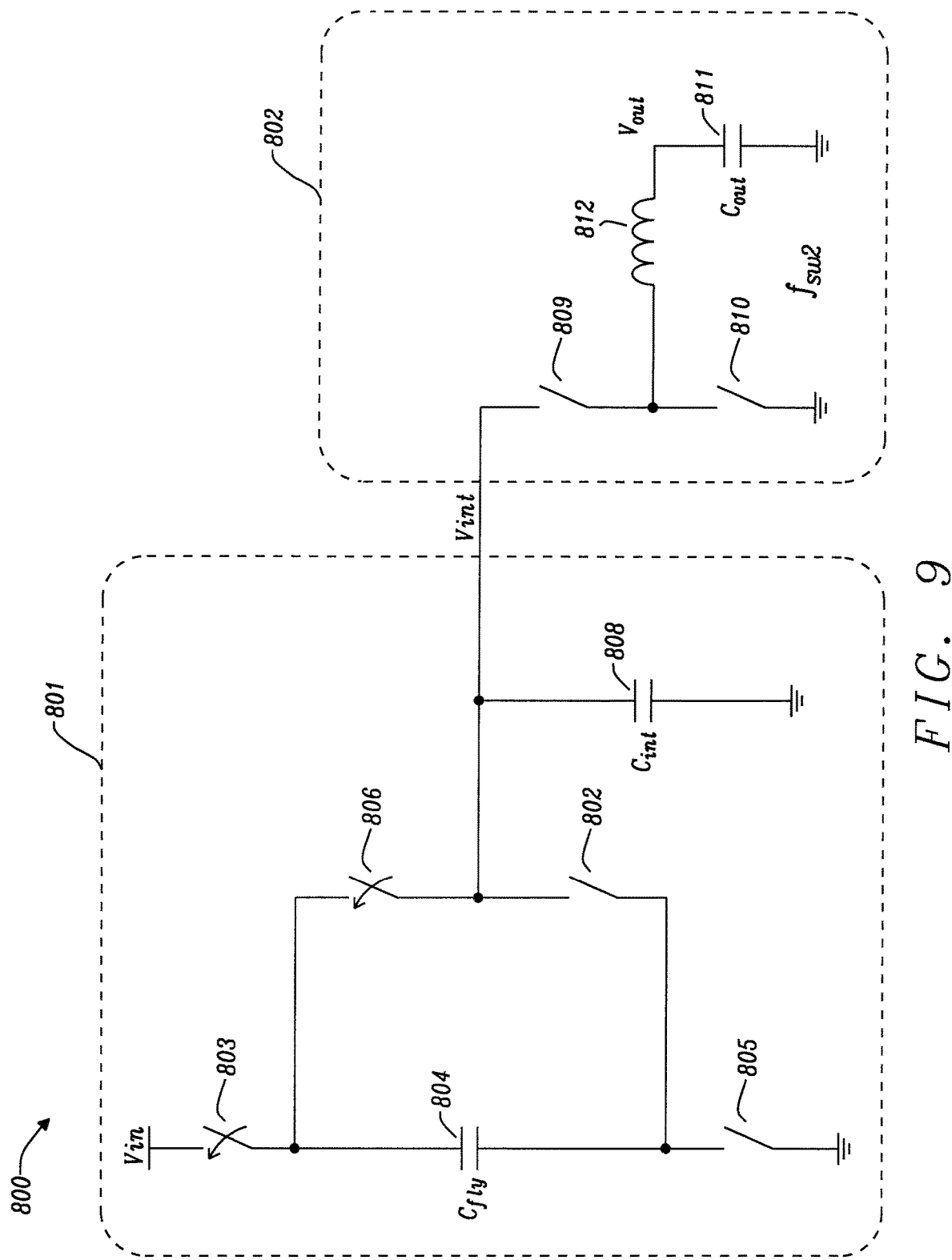
FIG. 9 shows an exemplary dual stage power converter with a disabled first stage.

FIG. 9 shows the same dual stage power converter as FIG. 8. This time, however, the voltage divider circuit 801 disables the first stage of the dual stage power converter by closing the first 803 and the third 806 switching element (as indicated by the arrows) and by opening the second 805 and the fourth 807 switching element. That is, in FIG. 9, only the second stage of the power converter is active and a low voltage is applied to input terminal Vin.

The SC circuit will be bypassed by a switch that will act as RCP (Reverse Charge Protection) and so the output of the wall adapter will be the input of the buck converter. The buck converter will be put e.g. in a standby mode meanwhile the SC circuit is turned off and the RCP turned on. But this may not be an issue since the buck converter typically has an active diode modality in which is the battery itself sustains the system voltage.

Figure 10:
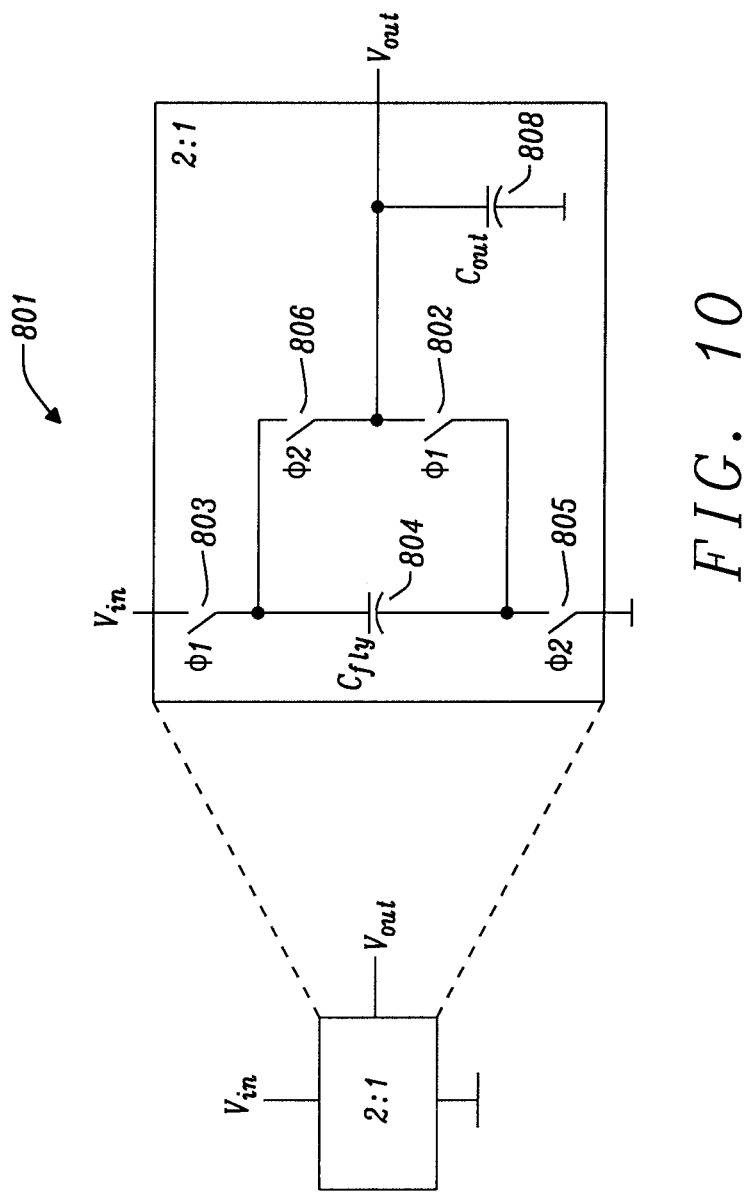
FIG. 10 shows an exemplary switched capacitor SC circuit.
Figure 11:
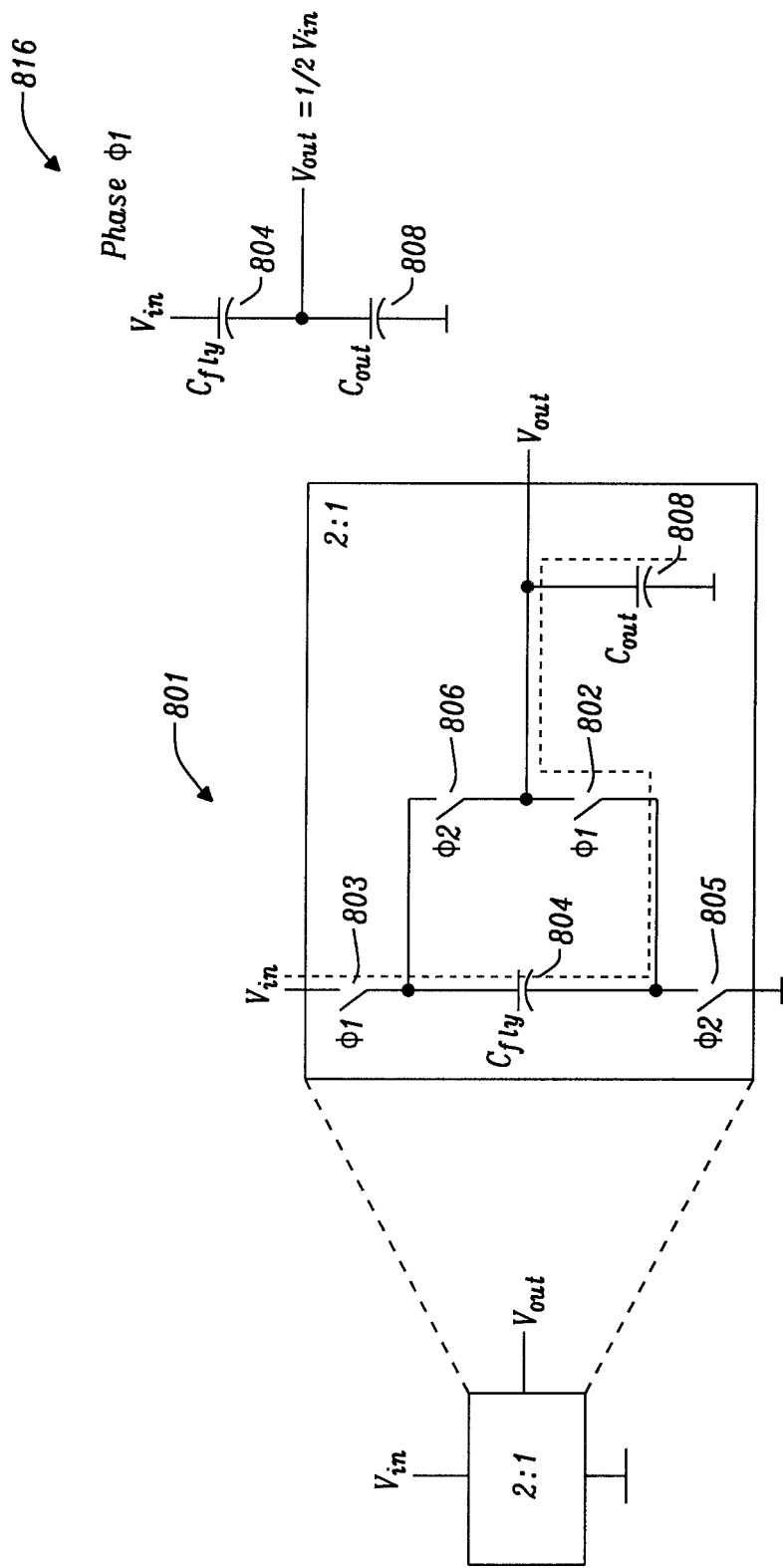
FIG. 11 shows currents in an exemplary switched capacitor SC circuit in a first switching state.
Figure 12:
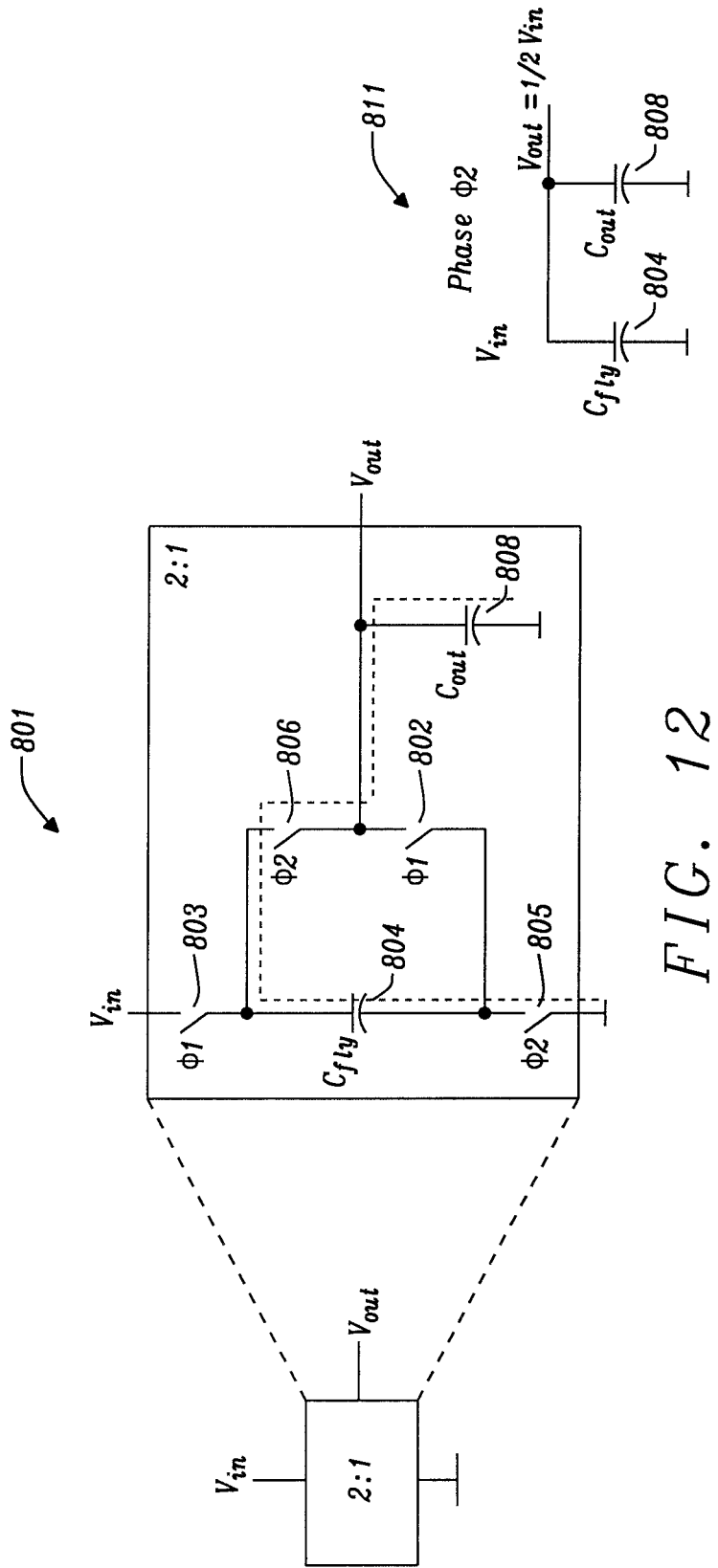
FIG. 12 shows currents in an exemplary switched capacitor SC circuit in a second switching state.

FIG. 10 shows another view of the exemplary switched capacitor SC circuit used as voltage divider circuit 801. Again, the same reference numerals denote the same circuit components as in the previous figures. FIG. 11 shows currents in the exemplary switched capacitor SC circuit in a first switching state. FIG. 12 shows currents in the exemplary switched capacitor SC circuit in a second switching state. As illustrated in FIGS. 10, 11, and 12, the described voltage divider circuit may also be regarded as a current multiplier circuit. That is, the voltage divider circuit 801 may be configured to receive an input current from the input of the dual stage power converter and configured to output an intermediate current at the intermediate node, wherein the intermediate current is larger than said input current. In the illustrated example, the intermediate current is double the input current, whereas the intermediate voltage is half the input voltage. In particular, the illustrated voltage divider circuit is configured to switch between a first switching state in which the first 803 and the fourth switching element 807 are closed and the second 805 and the third 806 switching element are open, and a second switching state in which the first 803 and the fourth 807 switching element are open, and the second 805 and the third 806 switching element are closed. The voltage divider circuit is configured to switch between the first switching state and the second switching state with a switching frequency that is substantially lower than a switching frequency of the voltage regulator circuit.

As can be seen in FIG. 11, in the first switching state, the flying capacitor 804 and the output capacitor 808 are charged. The simplified circuit 810 in FIG. 11 shows how the flying capacitor 804 and the output capacitor 808 are arranged in series between the input and ground in the first switching state. As can be seen in FIG. 12, in the second switching state, the flying capacitor 804 is discharged and the output capacitor 808 is charged. The simplified circuit 811 in FIG. 12 shows how the flying capacitor 804 and the output capacitor 808 are arranged in parallel between the output and ground in the second switching state. In other words, in the second switching state, the two capacitors connected in series behave like a voltage regulator.

Figure 14:
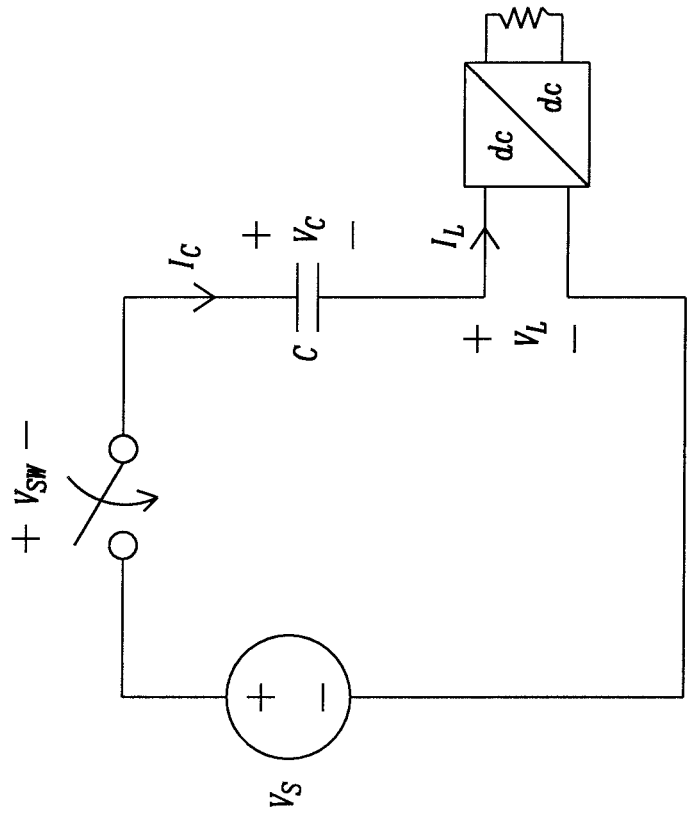
FIG. 14 shows another equivalent circuit diagram for explaining the soft switching strategy.
Figure 13:
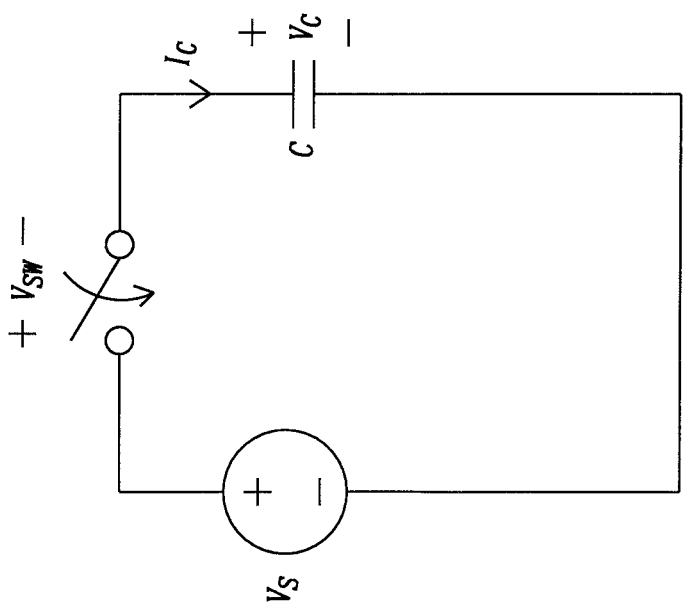
FIG. 13 shows an equivalent circuit diagram for explaining a soft switching strategy.

FIGS. 13 and 14 show equivalent circuit diagrams for explaining a soft switching strategy which may be applied to the switching elements of the voltage divider circuit. In a conventional SC power converter, the capacitor size and switching frequency are constrained by the requirement to keep the voltage ripple of the capacitors low to achieve high efficiency. This constraint restricts the designer of SC power converters to either use large capacitors (with corresponding low power density) or operate at a high switching frequency (which increases the switching losses). For a given switch and capacitor technology implementation, conventional SC DC-DC converters are thus limited in terms of their achievable power density and efficiency. The presented dual stage power converter in combination with soft charging operation, however, enables an increased capacitor ripple while maintaining low-loss operation. As a result, it becomes possible to reduce the switching frequency of the voltage divider circuit or the used capacitor sizes since there is no need to smoothly regulate the intermediate voltage.

Turning now to FIG. 14, since the voltage regulator circuit may be designed to operate at a much higher switching frequency than the SC stage, it may appear as a constant power load. The system may be designed such that during charging, the majority of the voltage difference between the capacitor and the voltage source appears across the input of Dc-Dc converter (i.e. the voltage regulator circuit), instead of the switch resistance, reducing the $\frac{1}{2}C(\Delta V)^2$ energy that would be lost in a hard charging circuit. With the soft charging technique, rather than being dissipated as heat in the resistive elements, the majority of the energy is captured and transferred to the output of the voltage regulator circuit where it may provide useful work. An important thing to note is that a SC converter operating with soft charging may no longer be restricted to keep the capacitor voltage ripple small for efficiency reasons, and can more effectively utilize the energy stored on the capacitors (enabling reduced switching frequency or capacitor size).

One of the efficiency improvements compared to a traditional high voltage buck converter comes from the fact that the voltage over the inductor is reduced. This reduces the current ripple as well, while allowing lower inductance values and lower core losses, wherein the core losses of the coil depend on the frequency and on the current ripple that is applied.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed:

1. A dual stage power converter for charging an energy storage device, the dual stage power converter comprising:
   a first stage comprising a voltage divider circuit with a flying capacitor configured to, during a first charging phase, convert an input voltage at an input of the dual stage power converter into a smaller, intermediate voltage at an intermediate node of the dual stage power converter; and
   a second stage comprising a voltage regulator circuit configured to receive said intermediate voltage for regulating, using a feedback loop, an output voltage at an output of the dual stage power converter,
   wherein the dual stage power converter further comprises an input voltage setting unit configured
   to instruct, during the first charging phase, an external power source to provide a first input voltage to the input of the dual stage power converter, and
   to instruct, during a second charging phase, the external power source to provide a second input voltage to the input of the dual stage power converter, wherein the first input voltage is larger than the second input voltage.

2. The dual stage power converter according to claim 1, wherein neither the first stage nor the voltage divider circuit includes a feedback loop for regulating the intermediate voltage.

3. The dual power stage power converter according to claim 1, wherein the voltage divider circuit is configured to, during the second charging phase, disable the first stage of the dual stage power converter by directly connecting the input of the dual stage power converter to the intermediate node of the dual stage power converter.

4. The dual stage power converter according to claim 1, wherein the voltage divider circuit is a switched capacitor SC circuit.

5. The dual stage power converter according to claim 1, wherein the voltage divider circuit is configured to receive an input current from the input of the dual stage power converter and configured to output an intermediate current at the intermediate node, wherein the intermediate current is larger than said input current.

6. The dual stage power converter according to claim 1, wherein the voltage divider circuit comprises a first switching element, a second switching element, a third switching element, and a fourth switching element, wherein
   the first switching element is coupled between an input of the voltage divider circuit and a first terminal of the flying capacitor,
   the second switching element is coupled between a second terminal of the flying capacitor and a reference potential,
   the third switching element is coupled between the first terminal of the flying capacitor and an output of the voltage divider circuit, and
   the fourth switching element is coupled between the second terminal of the flying capacitor and the output of the voltage divider circuit.

7. The dual stage power converter according to claim 6, wherein the voltage divider circuit is configured to disable the first stage of the dual stage power converter by closing the first and the third switching element and by opening the second and the fourth switching element.

8. The dual stage power converter according to claim 6, wherein the voltage divider circuit is configured to switch between
- a first switching state in which the first and the fourth switching element are closed and the second and the third switching element are open, and
- a second switching state in which the first and the fourth switching element are open, and the second and the third switching element are closed.

9. The dual stage power converter according to claim 8, wherein the voltage divider circuit is configured to switch between the first switching state and the second switching state with a switching frequency that is substantially lower than a switching frequency of the voltage regulator circuit.

10. The dual stage power converter according to claim 6, further comprising an output capacitor coupled between the output of the voltage divider circuit and a reference potential.

11. The dual stage power converter according to claim 1, wherein the voltage regulator circuit is a buck converter, a boost converter or a buck-boost converter.

12. The dual stage power converter according to claim 1, wherein the voltage regulator circuit is a buck converter comprising a high-side switching element, a low-side switching element and an inductor, wherein
- the inductor is coupled between a switching terminal and an output of the voltage regulator circuit,
- the high-side switching element is coupled between an input of the voltage regulator circuit and the switching terminal, and
- the low-side switching element is coupled between the switching terminal and a reference potential.

13. A method of operating a dual stage power converter for charging an energy storage device, the dual stage power converter comprising a first stage and a second stage, the method comprising:
- converting, by a voltage divider circuit with a flying capacitor of the first stage, during a first charging phase, an input voltage at an input of the dual stage power converter into a smaller, intermediate voltage at an intermediate node of the dual stage power converter;
- receiving, by a voltage regulator circuit of the second stage, said intermediate voltage; and
- regulating, by the voltage regulator circuit of the second stage, using a feedback loop, an output voltage at an output of the dual stage power converter, wherein the method further comprises:
- instructing, by an input voltage setting unit, during the first charging phase, an external power source to provide a first input voltage to the input of the dual stage power converter, and
- instructing, by the input voltage setting unit, during a second charging phase, the external power source to provide a second input voltage to the input of the dual stage power converter, wherein the first input voltage is larger than the second input voltage.

14. The method according to of claim 13, further comprising
- disabling, by the voltage divider circuit, during the second charging phase, the first stage of the dual stage power converter by directly connecting the input of the dual stage power converter to the intermediate node of the dual stage power converter.

15. The method according to claim 13, wherein the voltage divider circuit is a switched capacitor SC circuit.

16. The method according to claim 13, further comprising
- receiving, by the voltage divider circuit, an input current from the input of the dual stage power converter, and
- outputting, by the voltage divider circuit, an intermediate current at the intermediate node, wherein the intermediate current is larger than said input current.

17. The method according to claim 13, wherein the voltage divider circuit comprises a first switching element, a second switching element, a third switching element, and a fourth switching element, wherein the method further comprises
- coupling the first switching element between an input of the voltage divider circuit and a first terminal of the flying capacitor,
- coupling the second switching element between a second terminal of the flying capacitor and a reference potential,
- coupling the third switching element between the first terminal of the flying capacitor and an output of the voltage divider circuit, and
- coupling the fourth switching element between the second terminal of the flying capacitor and the output of the voltage divider circuit.

18. The method according to claim 17, further comprising disabling the first stage of the dual stage power converter by closing the first and the third switching element and by opening the second and the fourth switching element.

19. The method according to claim 17, further comprising switching, by the voltage divider circuit, between
- a first switching state in which the first and the fourth switching element are closed and the second and the third switching element are open, and
- a second switching state in which the first and the fourth switching element are open, and the second and the third switching element are closed.

20. The method according to claim 19, further comprising switching, by the voltage divider circuit, between the first switching state and the second switching state with a switching frequency that is substantially lower than a switching frequency of the voltage regulator circuit.

* * * * *